United States Patent
Grover et al.

(10) Patent No.: US 10,503,341 B2
(45) Date of Patent: *Dec. 10, 2019

(54) USABILITY ANALYSIS FOR USER INTERFACE BASED SYSTEMS

(71) Applicant: International Business Machines Corporation, Armonk, NY (US)

(72) Inventors: Vaibhav Grover, Sonepat (IN); Atul Prakash, New Delhi (IN); Swetha Sivaram, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 853 days.

This patent is subject to a terminal disclaimer.

(21) Appl. No.: 14/795,519

(22) Filed: Jul. 9, 2015

(65) Prior Publication Data

US 2017/0010774 A1 Jan. 12, 2017

(51) Int. Cl.
*G06F 17/00* (2019.01)
*G06F 3/048* (2013.01)
(Continued)

(52) U.S. Cl.
CPC ............ *G06F 3/048* (2013.01); *G06F 8/77* (2013.01); *G06F 9/451* (2018.02); *G06F 11/34* (2013.01);
(Continued)

(58) Field of Classification Search
CPC ............ G06F 11/3604; G06F 11/3616; G06F 11/368; G06F 11/3692; G06F 11/3664;
(Continued)

(56) References Cited

U.S. PATENT DOCUMENTS

| 8,191,004 B2 | 5/2012 | Chandrasekar et al. |
| 8,386,966 B1 | 2/2013 | Attinasi et al. |

(Continued)

FOREIGN PATENT DOCUMENTS

EP 2369481 A2 9/2011

OTHER PUBLICATIONS

IBM, "List of IBM Patents or Patent Applications Treated as Related (Appendix P)," Nov. 23, 2015, p. 1-2.
(Continued)

*Primary Examiner* — Cesar B Paula
*Assistant Examiner* — David Faber
(74) *Attorney, Agent, or Firm* — Erik K. Johnson

(57) ABSTRACT

A method for evaluating the usability of user interfaces is provided. The method may include capturing user interface data. The method may also include determining whether the plurality of user interface data follows user interface guidelines associated with the user interface. The method may further include determining scores for the user interface based on the determination of whether the user interface data follows the user interface guidelines. Additionally, the method may include implementing the user interface using the user interface data to log usage data associated with the user interface. The method may also include capturing user interaction data associated with the user interface based on the logging of the usage data. The method may further include detecting correlations between the user interface data and the user interaction data. The method may also include presenting the scores, correlations, and an analysis based on the scores and the correlations.

11 Claims, 6 Drawing Sheets

(51) Int. Cl.
*G06F 11/36* (2006.01)
*G06F 11/34* (2006.01)
*G06F 8/77* (2018.01)
*G06F 9/451* (2018.01)
*G06F 3/0484* (2013.01)
*G06F 8/38* (2018.01)

(52) U.S. Cl.
CPC ...... *G06F 11/3438* (2013.01); *G06F 11/3692* (2013.01); *G06F 3/0484* (2013.01); *G06F 8/38* (2013.01); *G06F 11/3604* (2013.01); *G06F 11/368* (2013.01); *G06F 11/3612* (2013.01); *G06F 11/3616* (2013.01); *G06F 11/3664* (2013.01)

(58) Field of Classification Search
CPC ...... G06F 11/3612; G06F 8/71; G06F 3/0484; G06F 3/048; G06F 11/3438; G06F 9/451; G06F 8/77; G06F 11/34; G06F 8/38
See application file for complete search history.

(56) References Cited

U.S. PATENT DOCUMENTS

| | | | | |
|---|---|---|---|---|
| 8,924,942 | B1* | 12/2014 | Makuch | G06F 9/44 715/762 |
| 9,329,842 | B1* | 5/2016 | Chan | G06F 11/368 |
| 9,946,695 | B2* | 4/2018 | Zhang | G06F 17/24 |
| 2002/0118225 | A1* | 8/2002 | Miksovsky | G06F 8/38 715/762 |
| 2004/0060008 | A1* | 3/2004 | Marshall | G06F 16/958 715/205 |
| 2006/0271856 | A1* | 11/2006 | Raymond | G06F 8/38 715/730 |
| 2008/0148235 | A1* | 6/2008 | Foresti | G06F 11/3604 717/123 |
| 2008/0301553 | A1* | 12/2008 | Basu | G06F 8/10 715/700 |
| 2010/0229112 | A1 | 9/2010 | Ergan et al. | |
| 2010/0251128 | A1* | 9/2010 | Cordasco | G06F 11/328 715/736 |
| 2012/0198364 | A1* | 8/2012 | Bornheimer | G06F 8/38 715/762 |
| 2012/0210209 | A1 | 8/2012 | Biddle | |
| 2013/0326465 | A1 | 12/2013 | Jain et al. | |
| 2013/0346950 | A1 | 12/2013 | Horovitz et al. | |
| 2014/0245115 | A1* | 8/2014 | Zhang | G06F 17/24 715/202 |
| 2014/0282117 | A1* | 9/2014 | Anderson | G06F 16/24 715/760 |
| 2014/0337694 | A1* | 11/2014 | Haramaty | G06F 16/958 715/204 |
| 2015/0012852 | A1* | 1/2015 | Borodin | G06F 11/3664 715/762 |
| 2015/0052503 | A1* | 2/2015 | Ligman | G06F 11/3664 717/125 |
| 2015/0089424 | A1* | 3/2015 | Duffield | G06Q 10/00 715/771 |
| 2015/0254246 | A1* | 9/2015 | Sheth | G06F 16/24578 707/728 |
| 2016/0275003 | A1* | 9/2016 | Balakrishnan | G06F 11/3672 |
| 2016/0335316 | A1* | 11/2016 | Riva | G06F 16/2448 |

OTHER PUBLICATIONS

Grover et al., "Usability Analysis for User Interface Based Systems," filed Nov. 23, 2015, U.S. Appl. No. 14/948,961.

Usability Sciences, "Beyong Web Analytics—Uncovering Hidden Roadblocks to Conversion," White Paper Published on Usability Sciences, p. 1-3, http://www.usabilitysciences.com/white-paper-beyond-web-analytics-uncovering-hidden-roadblocks-to-conversion, Accessed on Apr. 1, 2015.

Camiade, "Usability Analysis in Web Analytics: Methods and Tools," AT Internet White Paper, 2011, p. 1-18, AT Internet Online Intelligence Solutions.

Mell et al., "The NIST Definition of Cloud Computing," National Institute of Standards and Technology, Sep. 2011, Special Publication 800-145, 7 pages.

Tomlin, "24 Usability Testing Tools," Useful Usability, Oct. 2014, p. 1-19, http://www.usefulusability.com/24-usability-testing-tools/, Accessed on Apr. 2, 2015.

Carroll, Marty, "Usability and Web analytics: ROI justification for an Internet strategy," Interactive Marketing, vol. 4, No. 3, pp. 223-234, The Usability Company, Jan./Mar. 2003.

\* cited by examiner

USABILITY ANALYSIS FOR USER INTERFACE BASED SYSTEMS

BACKGROUND

The present invention relates generally to the field of computing, and more specifically, to user interfaces.

User interfaces are deployed on applications and programs such as web browsers, email programs, machinery, and operating systems for computer and mobile devices. Generally, user interfaces enable users to control and operate devices to produce a desired result. Specifically, user interfaces may include a set of commands and menus to communicate with applications and programs. As such, user interfaces are typically designed for efficiency and ease of operation. Furthermore, user interface design requires an understanding of user needs and of the functionality required by the system to accomplish the user needs. Therefore, different phases or processes may be involved in user interface design, and may include such processes as user and task analysis, information architecture, prototyping, simulation, and usability testing to test the performance of the user interface.

SUMMARY

A method for evaluating the usability of at least one user interface is provided. The method may include capturing a plurality of user interface data associated with the at least one user interface. The method may also include determining whether the plurality of user interface data follows a plurality of user interface guidelines associated with the at least one user interface. The method may further include determining a plurality of scores for the at least one user interface based on the determination of whether the plurality of user interface data follows the plurality of user interface guidelines. Additionally, the method may include implementing the at least one user interface using the plurality of user interface data to log a plurality of usage data associated with the at least one user interface. The method may also include capturing a plurality of user interaction data associated with the at least one user interface based on the logging of the plurality of usage data associated with the at least one user interface. The method may further include detecting a plurality of correlations between the plurality of user interface data and the plurality of user interaction data. The method may also include presenting the plurality of scores, the plurality of correlations, and a plurality of analysis based on the plurality of scores and the plurality of correlations.

A computer system for evaluating the usability of at least one user interface is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include capturing a plurality of user interface data associated with the at least one user interface. The method may also include determining whether the plurality of user interface data follows a plurality of user interface guidelines associated with the at least one user interface. The method may further include determining a plurality of scores for the at least one user interface based on the determination of whether the plurality of user interface data follows the plurality of user interface guidelines. Additionally, the method may include implementing the at least one user interface using the plurality of user interface data to log a plurality of usage data associated with the at least one user interface. The method may also include capturing a plurality of user interaction data associated with the at least one user interface based on the logging of the plurality of usage data associated with the at least one user interface. The method may further include detecting a plurality of correlations between the plurality of user interface data and the plurality of user interaction data. The method may also include presenting the plurality of scores, the plurality of correlations, and a plurality of analysis based on the plurality of scores and the plurality of correlations.

A computer program product for evaluating the usability of at least one user interface is provided. The computer program product may include one or more computer-readable storage devices and program instructions stored on at least one of the one or more tangible storage devices, the program instructions executable by a processor. The computer program product may include program instructions to capture a plurality of user interface data associated with the at least one user interface. The computer program product may further include program instructions to determine whether the plurality of user interface data follows a plurality of user interface guidelines associated with the at least one user interface. The computer program product may also include program instructions to determine a plurality of scores for the at least one user interface based on the determination of whether the plurality of user interface data follows the plurality of user interface guidelines. Additionally, the computer program product may further include program instructions to implement the at least one user interface using the plurality of user interface data to log a plurality of usage data associated with the at least one user interface. The computer program product may also include program instructions to capture a plurality of user interaction data associated with the at least one user interface based on the logging of the plurality of usage data associated with the at least one user interface. The computer program product may further include program instructions to detect a plurality of correlations between the plurality of user interface data and the plurality of user interaction data. The computer program product may also include program instructions to present the plurality of scores, the plurality of correlations, and a plurality of analysis based on the plurality of scores and the plurality of correlations

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
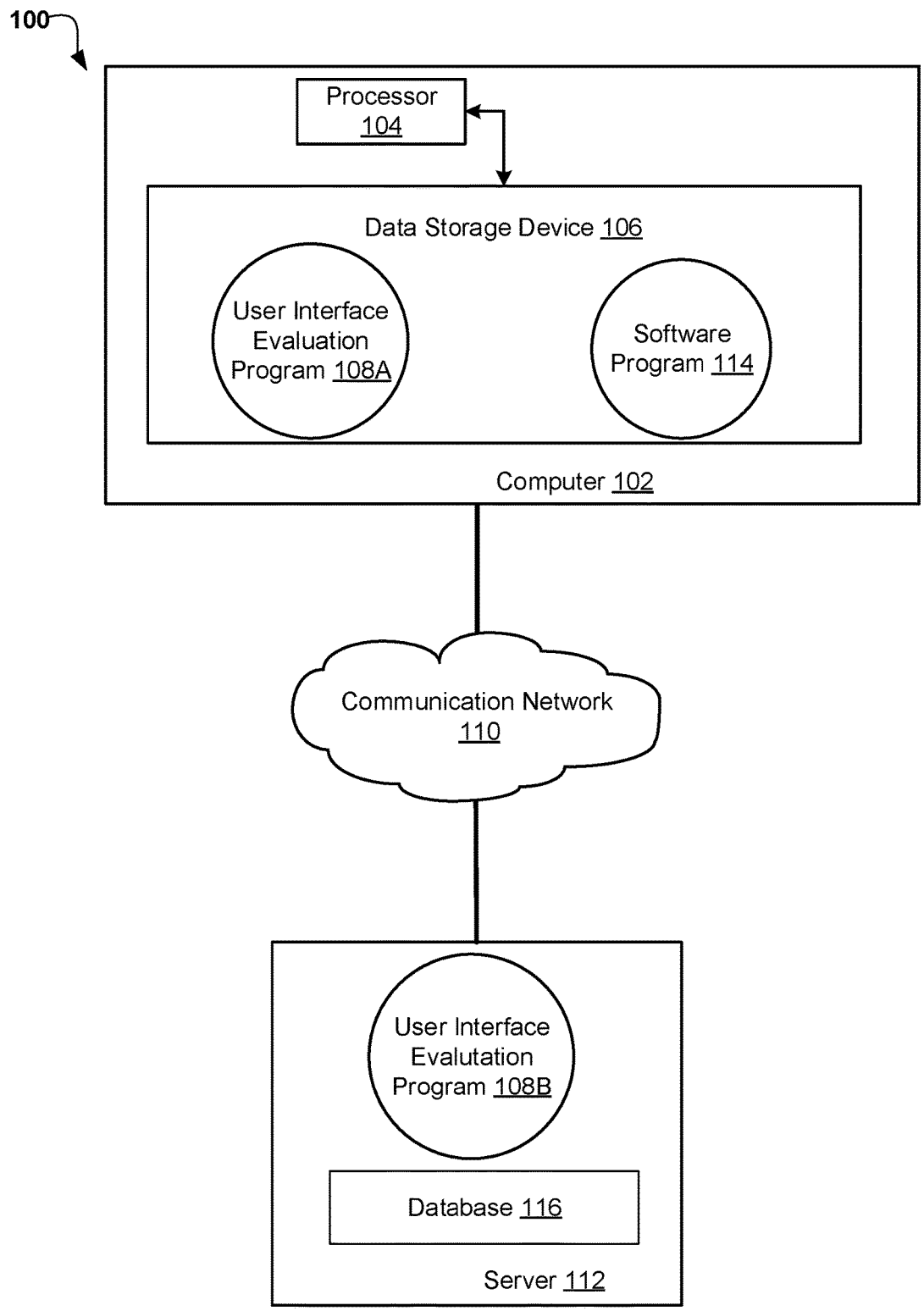
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to user interfaces. The following described exemplary embodiments provide a system, method and program product for evaluating the usability of user interfaces. Therefore, the present embodiment has the capacity to improve the technical field of user interface design by improving the operability and efficiency of user interfaces based on evaluating the usability of the user interfaces. Specifically, the usability of user interfaces may be evaluated by capturing the user interface details, and capturing user interaction with the user interface details, to identify correlating factors and improvements.

As previously described with respect to user interface design, user interfaces may be evaluated for efficiency and ease of operation. Furthermore, the design of user interfaces requires an understanding of user needs and of the functionality required by the system to accomplish the user needs. Therefore, application developers may need to evaluate the usability of user interfaces. Additionally, application developers may want to determine the operability of user interfaces and the errors affecting the operability based on user interaction with the user interfaces. Furthermore, application developers may want to identify usability issues, determine the cause of the usability issues, and take corrective steps to improve usability based on the usability issues. As such, it may be advantageous, among other things, to provide a system, method and program product for evaluating the usability of user interfaces by capturing and analyzing user interface details and analyzing user interaction with the user interface to improve the user interface design. Specifically, the system, method and program product may capture user interface details and user interaction details, and identify correlating factors based on the user interaction with the user interface to evaluate the efficiency of the user interface and to improve usability.

According to at least one embodiment of the present invention, the usability of user interfaces may be evaluated. Therefore, in one embodiment, user interface data may be captured. Then, according to one implementation, the user interface data may be evaluated to determine whether the user interface details meet user interface guidelines. Also, according to one implementation, a score for the user interface data may be determined. Next, according to one implementation, the user interface may be implemented to log usage details. Then, according to one implementation, user interaction data may be captured. Next, according to one implementation, correlations between the user interface data and the user interaction data may be detected. Furthermore, according to one implementation, the scoring data and the correlation data may be presented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for evaluating the usability of user interfaces by capturing user interface data and user interaction data and identifying correlating factors to improve the user interface.

According to at least one embodiment of the present invention, the usability of user interfaces may be evaluated. Therefore, user interface data may be captured. Then, the user interface data may be evaluated to determine whether the user interface data meets user interface guidelines. Also, the user interface data may be scored based on the determination of whether the user interface data meets user interface guidelines. Next, the user interface may be implemented to log usage details. Then, user interaction data may be captured. Next, correlations between the user interface data and the user interaction data may be detected. Furthermore, according to one implementation, the scores and the correlations may be presented.

Referring now to FIG. 1, an exemplary networked computer environment 100 in accordance with one embodiment is depicted. The networked computer environment 100 may include a computer 102 with a processor 104 and a data storage device 106 that is enabled to run a user interface evaluation program 108A and a software program 114. The software program 114 may be an application program such as an internet browser and an email program. The user interface evaluation program 108A may communicate with the software program 114. The networked computer environment 100 may also include a server 112 that is enabled to run a user interface evaluation program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, both client computer 102 and server computer 112 may include internal components 800 and external components 900. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the user interface evaluation program 108A, 108B may interact with a database 116 that may be embedded in various storage devices, such as, but not limited to a mobile device 102, a networked server 112, or a cloud storage service.

According to the present embodiment, a program, such as a user interface evaluation program 108A and 108B may run on the client computer 102 or on the server computer 112 via a communications network 110. The user interface evaluation program 108A, 108B may evaluate the usability of user interfaces. For example, a user using a computer, such as computer 102, may run a user interface evaluation program 108A, 108B, that interacts with a database 116, to evaluate the usability of user interfaces by capturing user interface data and user interaction data, and identifying correlations between the user interface data to improve the user interface.

Figure 2:
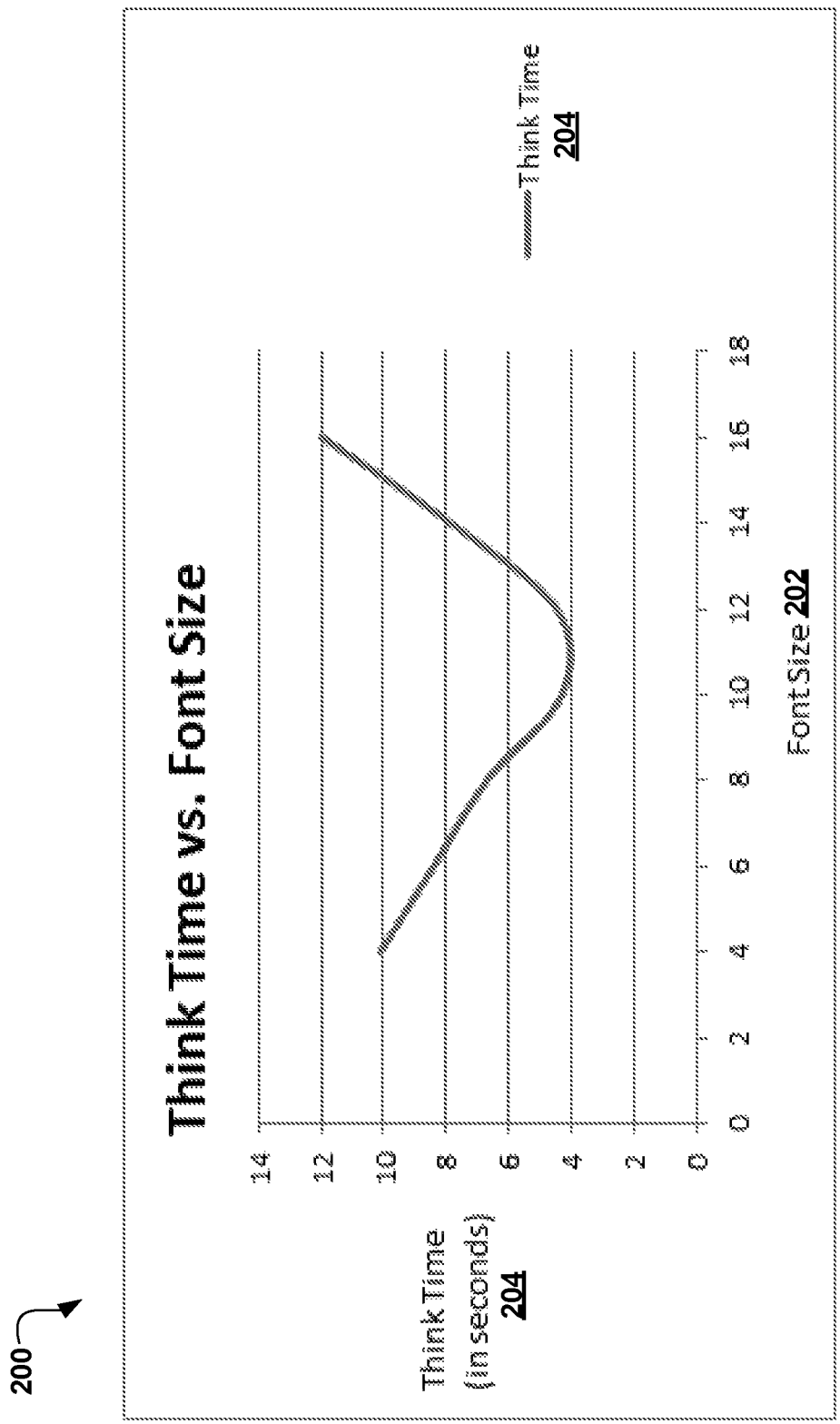
FIG. 2 is an example of correlations graph according to one embodiment.

Referring now to FIG. 2, an example of a correlations graph 200 according to one embodiment is depicted. According to one implementation, the user interface evaluation program 108A, 108B (FIG. 1) may capture user interface data. For example, the user interface may be a user interface for a mobile application and/or a web-based application, having one or more navigable display screens. Furthermore, the user interface evaluation program 108A, 108B (FIG. 1) may capture user interface data such as, but not limited to, screen size, screen resolution, font size 202, font color, background color, application icons, and user interface controls. Additionally, the user interface evaluation program 108A, 108B (FIG. 1) may capture user interaction data. Specifically, the user interface evaluation program 108A, 108B (FIG. 1) may capture and analyze user interactions with the user interface such as, but not limited to, the user interface controls clicked on by the user, the time spent on the navigable display screens, and the think time 204 of the user to accomplish specific tasks.

Thereafter, the user interface evaluation program 108A, 108B (FIG. 1) may detect correlations between the user interface data and the user interaction data. For example, the user interface evaluation program 108A, 108B (FIG. 1) may determine that the differences in the font size 202 used in user interfaces may affect the readability and think time 204 by users. Specifically, the user interface evaluation program 108A, 108B (FIG. 1) may determine that a threshold font size 202 of 10-12 point font may positively affect the readability of the user interface and thereby decrease the think time 204 for users to perform tasks, as opposed to font sizes 202 beyond the threshold font size that negatively affects readability and increases user think time 204. As such, the user interface evaluation program 108A, 108B (FIG. 1) may display the correlation between the font size 202 and the think time 204 in a correlations graph 200.

Figure 3:
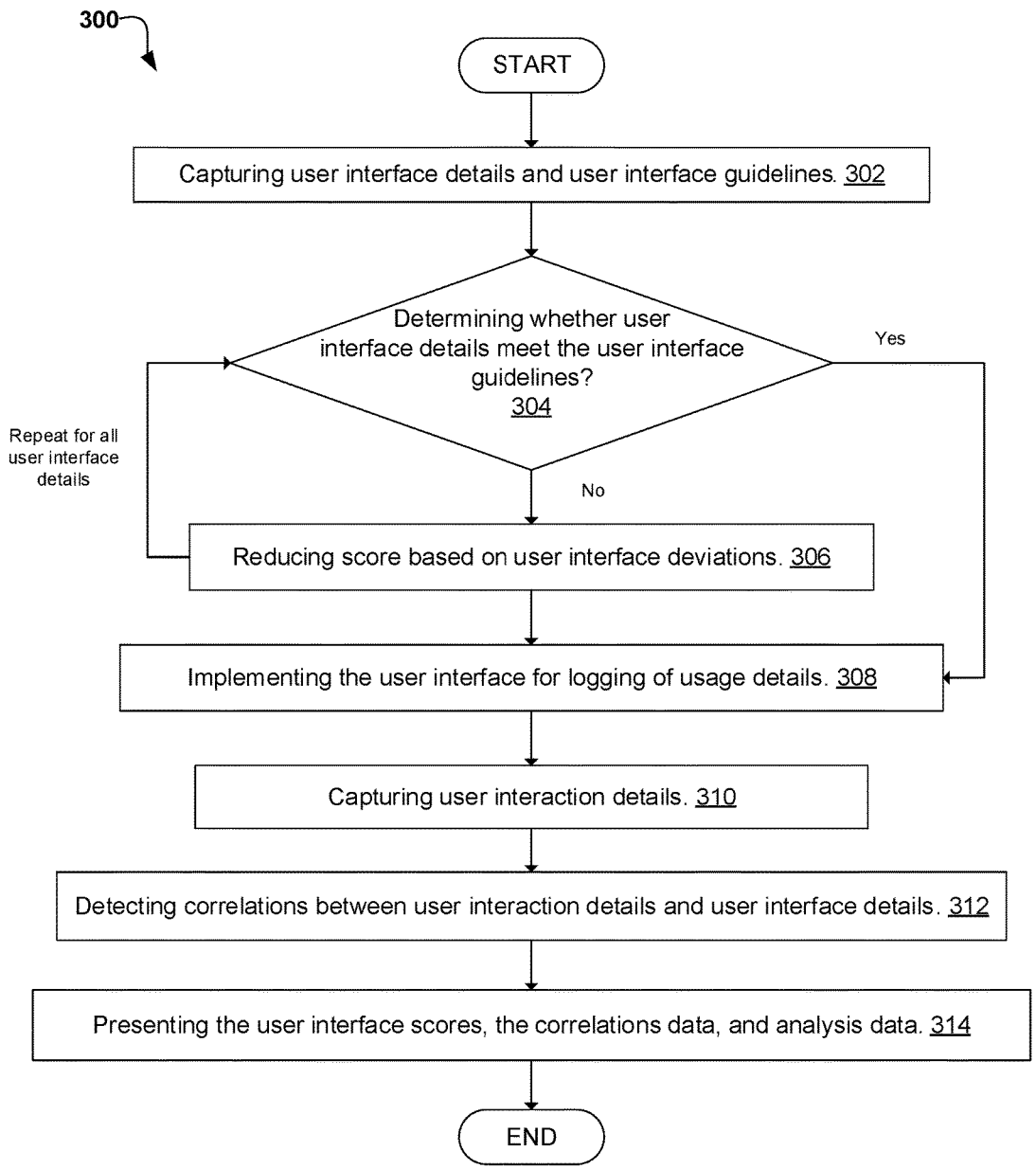
FIG. 3 is an operational flowchart illustrating the steps carried out by a program for evaluating the usability of user interfaces.

Referring now to FIG. 3, an operational flowchart 300 illustrating the steps carried out by a program for evaluating the usability of user interfaces is depicted. At 302, the user interface evaluation program 108A, 108B (FIG. 1) may capture the user interface data and user interface guidelines associated with a user interface. As previously described in FIG. 2, the user interface evaluation program 108A, 108B (FIG. 1) may evaluate user interfaces that are associated with mobile and web-based applications. Therefore, the user interface evaluation program 108A, 108B (FIG. 1) may capture the user interface data such as, but not limited to, the screen size, the screen resolution, the font size 202 (FIG. 2), the font color, the background color, the placement icon/link, the readability based on the font size to screen size ratio, the font size to screen resolution ratio, font color to background color ratio, and the consistency of appearance and placement of user interface controls and language.

Furthermore, the user interface evaluation program 108A, 108B (FIG. 1) may capture the user interface guidelines that determine the user interface details. Specifically, user interfaces may be designed based on user interface guidelines associated with the user interface. For example, the user interface guidelines may determine the font size, the screen size, and the icon placement. Accordingly, the user interface evaluation program 108A, 108B (FIG. 1) may capture the user interface guidelines such as, but not limited to, device guidelines, industry guidelines, and company guidelines. For example, a company may design a user interface associated with a mobile application for an APPLE® device (APPLE® and all APPLE®-based trademarks and logos are trademarks or registered trademarks of APPLE® and/or its affiliates). As such, the user interface evaluation program 108A, 108B (FIG. 1) may capture the user interface data as well as the company guidelines, the APPLE® device guidelines, and the industry guidelines associated with the user interface.

Then, at 304, the user interface evaluation program 108A, 108B (FIG. 1) may determine whether the user interface data meets the user interface guidelines. As previously described in step 302, user interface data may be designed based on user interface guidelines, such as device guidelines, company guidelines, and industry guidelines, associated with the user interface. As such, the user interface evaluation program 108A, 108B (FIG. 1) may determine whether the user interface data meets the device guidelines, industry guidelines, and company guideline by scoring the user interface. Specifically, according to one embodiment, the user interface evaluation program 108A, 108B (FIG. 1) may determine that a user interface having user interface data fully meeting the user interface guidelines receive a score of 1 and then move on to step 308. Alternatively, the user interface evaluation program 108A, 108B (FIG. 1) may determine that a user interface having user interface data deviating from the user interface guidelines receive a score less than 1, wherein 0 is the lowest possible score, and move to step 306.

Therefore, at 306, the user interface evaluation program 108A, 108B (FIG. 1) may reduce the score for the user interface based on user interface deviations. As previously, described in step 304, the user interface evaluation program 108A, 108B (FIG. 1) may determine that a user interface having user interface data fully meeting the user interface guidelines may receive a score of 1. However, the user interface evaluation program 108A, 108B (FIG. 1) may reduce the score for the user interface based on the user interface data not meeting the user interface guidelines. For example, the user interface evaluation program 108A, 108B (FIG. 1) may capture user interface data associated with a mobile application, such as the font size 202 (FIG. 2) and background color, as well as capture the user interface guidelines. Then, the user interface evaluation program 108A, 108B (FIG. 1) may determine that the background color meets the user interface guidelines, but determine that the font size 202 (FIG. 2) does not meet the user interface guidelines. Therefore, the user interface evaluation program 108A, 108B (FIG. 1) may reduce the score of the font size parameter from 1 to a lesser score based on the font size 202 (FIG. 2) deviating from the user interface guidelines.

Next, at 308, the user interface evaluation program 108A, 108B (FIG. 1) may implement the user interface to log usage details. As previously described in step 302, the user interface evaluation program 108A, 108B (FIG. 1) may capture the user interface data associated with a user interface. As such, the user interface evaluation program 108A, 108B (FIG. 1) may implement the user interface to log usage of the user interface data by deploying the user interface and enabling notifications based on the usage details. Specifically, the user interface evaluation program 108A, 108B

(FIG. 1) may log usage details by enabling notifications based on user interactions with the user interface data. Also, according to one embodiment, the user interface evaluation program 108A, 108B (FIG. 1) may log usage details for a specified time period, for a specified number of users, and for a specified number of display screens For example, the user interface evaluation program 108A, 108B (FIG. 1) may implement a user interface associated with a web application to log user interactions with the user interface whereby the user interface evaluation program 108A, 108B (FIG. 1) may receive notifications such as, but not limited to, a user clicking on a link associated with the user interface, a user accessing a display screen associated with the user interface at a specific time, and the time spent by users scrolling on specified pages.

Then, at 310, the user interface evaluation program 108A, 108B (FIG. 1) may capture the user interaction data. As previously described in step 308, the user interface evaluation program 108A, 108B (FIG. 1) may log usage details based on user interactions with the user interface details. Therefore, the user interface evaluation program 108A, 108B (FIG. 1) may capture the user interaction data based on the logging of the usage details. For example, and as previously described in FIG. 2, the user interface evaluation program 108A, 108B (FIG. 1) may capture and analyze user interaction data such as, but not limited to, the icons/links clicked on by users, the click path by users, the distance covered by users to click on specified links, the time spent by users on the navigable display screens, the number and type of actions performed on specified screens, and the think time 204 (FIG. 2) for users to accomplish specific tasks through the user interface.

Next, at 312, the user interface evaluation program 108A, 108B (FIG. 1) may detect correlations between the user interaction data and the user interface data. As previously described in step 306, the user interface evaluation program 108A, 108B (FIG. 1) may reduce the score for the user interface based on deviations by the user interface data from the user interface guidelines. Therefore, according to one embodiment, the user interface evaluation program 108A, 108B (FIG. 1) may detect correlations between the user interaction data and the user interface data based on the user interface deviations. For example, the user interface evaluation program 108A, 108B (FIG. 1) may reduce the score for the user interface based on the font size 202 (FIG. 2) not meeting the user interface guidelines. As such, and as previously described in FIG. 2, the user interface evaluation program 108A, 108B (FIG. 1) may determine that the differences in the font size 202 (FIG. 2) used in the user interfaces may affect the readability and think time 204 (FIG. 2) by users. Specifically, the user interface evaluation program 108A, 108B (FIG. 1) may determine that a threshold font size 202 (FIG. 2) of 10-12 point font may positively affect the readability of the user interface and thereby decrease the think time 204 (FIG. 2) for users to perform tasks, as opposed to font sizes 202 (FIG. 2) beyond the threshold font size that negatively affects readability and increases user think time 204 (FIG. 2). Furthermore, the user interface evaluation program 108A, 108B (FIG. 1) may detect correlations such as, but not limited to, the placement of certain controls may affect the time spent on screens, the font color may affect the actions performed on certain screens, and the screen size may affect the distance covered and time spent scrolling on certain screens.

Then, at 314, the user interface evaluation program 108A, 108B (FIG. 1) may present the user interface scoring data, the correlations data, and analysis data. As previously described in step 304, the user interface evaluation program 108A, 108B (FIG. 1) may determine whether the user interface data meets the device guidelines, industry guidelines, and company guidelines by scoring the user interface. Also, as previously described in step 312, the user interface evaluation program 108A, 108B (FIG. 1) may detect correlations between the user interaction data and the user interface data. Furthermore, the user interface evaluation program 108A, 108B (FIG. 1) may present the scoring data and the correlation data, as well as analysis of the scoring data and correlations data, in a report.

For example, the user interface evaluation program 108A, 108B (FIG. 1) may present in the report an overall score for the user interface based on whether the user interface data meets the user interface guidelines, and may also present a score for the user interface based on whether the user interface data individually meets the user interface guidelines. Specifically, the user interface evaluation program 108A, 108B (FIG. 1) may present a score for the user interface based on the device guidelines, a score for the user interface based on the company guidelines, and a score for the user interface based on the industry guidelines in the report. Additionally, the user interface evaluation program 108A, 108B (FIG. 1) may present a score for each user interface parameter such as a score for the font color, a score for the background color, a score for the font size 202 (FIG. 2), and a score for placement of user interface controls. Also, for example, and as previously described in FIG. 2, the user interface evaluation program 108A, 108B (FIG. 1) may plot the correlations in a correlations graph 200 (FIG. 2) and present the correlations graph 200 (FIG. 2) in the report. Additionally, the user interface evaluation program 108A, 108B (FIG. 1) may present an analysis of the scoring data and the correlations data. For example, based on the logging of usage details associated with the placement of icons/links on a certain user interface screen, the user interface evaluation program 108A, 108B (FIG. 1) may determine that exceeding a certain threshold number of icons/links on a corner of the user interface screen may result in users having to return to the user interface screen for erroneously clicking on a least one of the icons/links not associated with the task the users want to accomplish.

Figure 4:
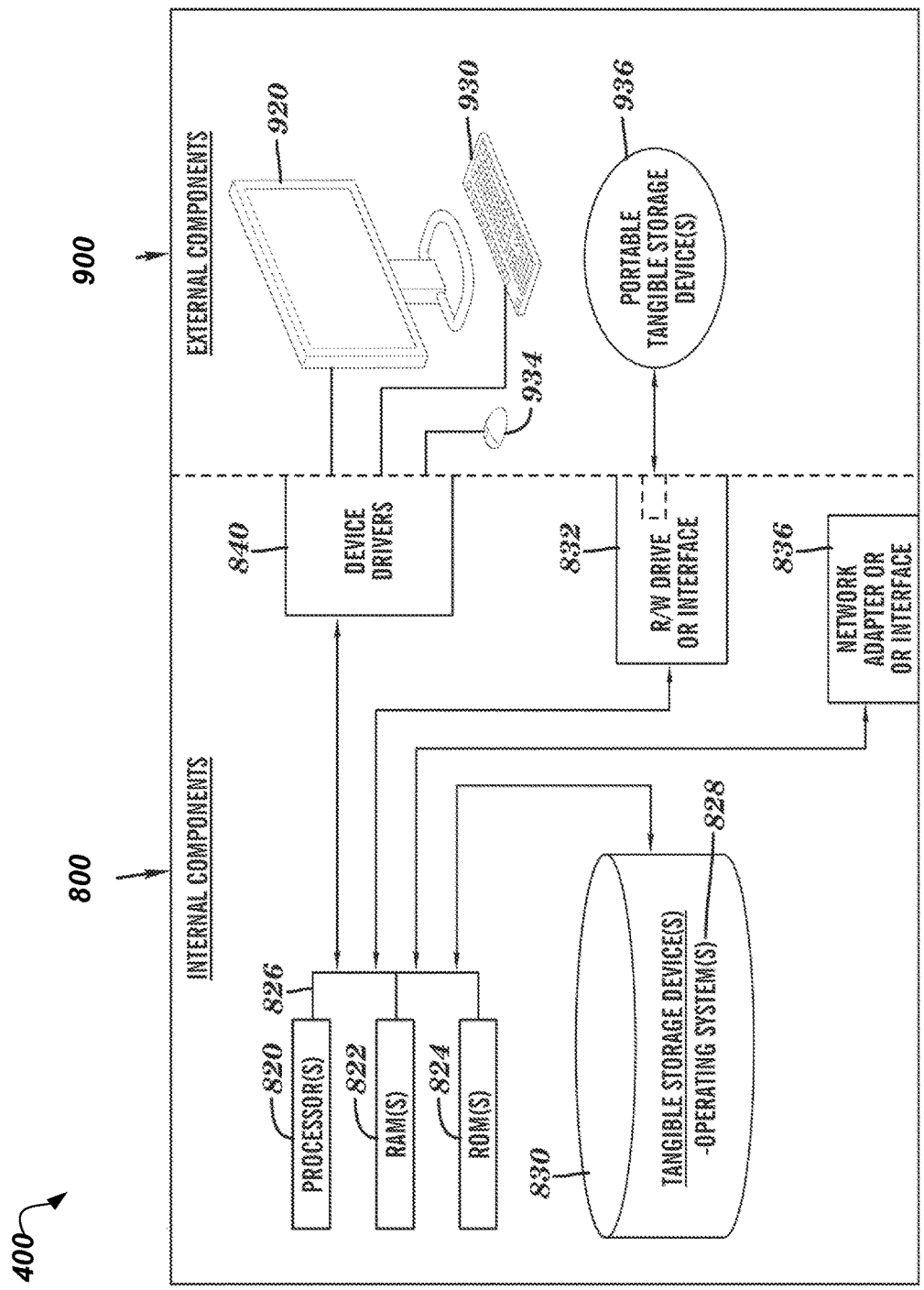
FIG. 4 is a block diagram of the system architecture of a program for evaluating the usability of user interfaces.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 and external components 900 illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the user interface evaluation program 108A (FIG. 1) in client computer 102 (FIG. 1), and the user interface evaluation program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as user interface evaluation program 108A and 108B (FIG. 1), can be stored on one or more of the respective portable computer-readable tangible storage devices 936, read via the respective R/W drive or interface 832 and loaded into the respective hard drive 830.

Each set of internal components 800 also includes network adapters or interfaces 836 such as a TCP/IP adapter cards, wireless Wi-Fi interface cards, or 3G or 4G wireless interface cards or other wired or wireless communication links. The user interface evaluation program 108A (FIG. 1) and software program 114 (FIG. 1) in client computer 102 (FIG. 1), and user interface evaluation program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the user interface evaluation program 108A (FIG. 1) and software program 114 (FIG. 1) in client computer 102 (FIG. 1) and the user interface evaluation program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
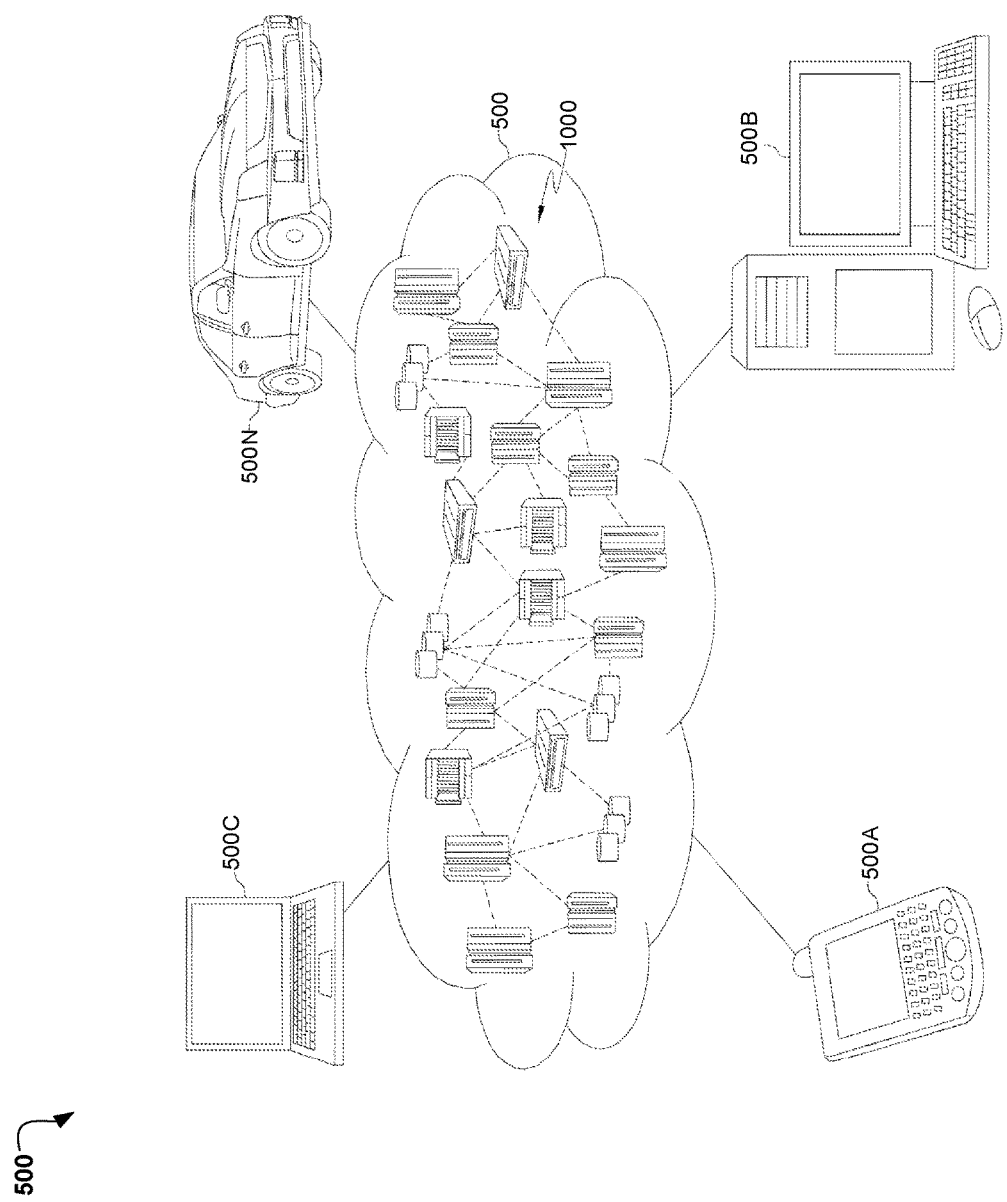
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 1000 with which local computing devices used by cloud consumers, such as, for example, personal digital assistant (PDA) or cellular telephone 500A, desktop computer 500B, laptop computer 500C, and/or automobile computer system 500N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 1000 and cloud computing environment 500 can communicate with any type of computerized device over any type of network and/or network addressable connection (e.g., using a web browser).

Figure 6:
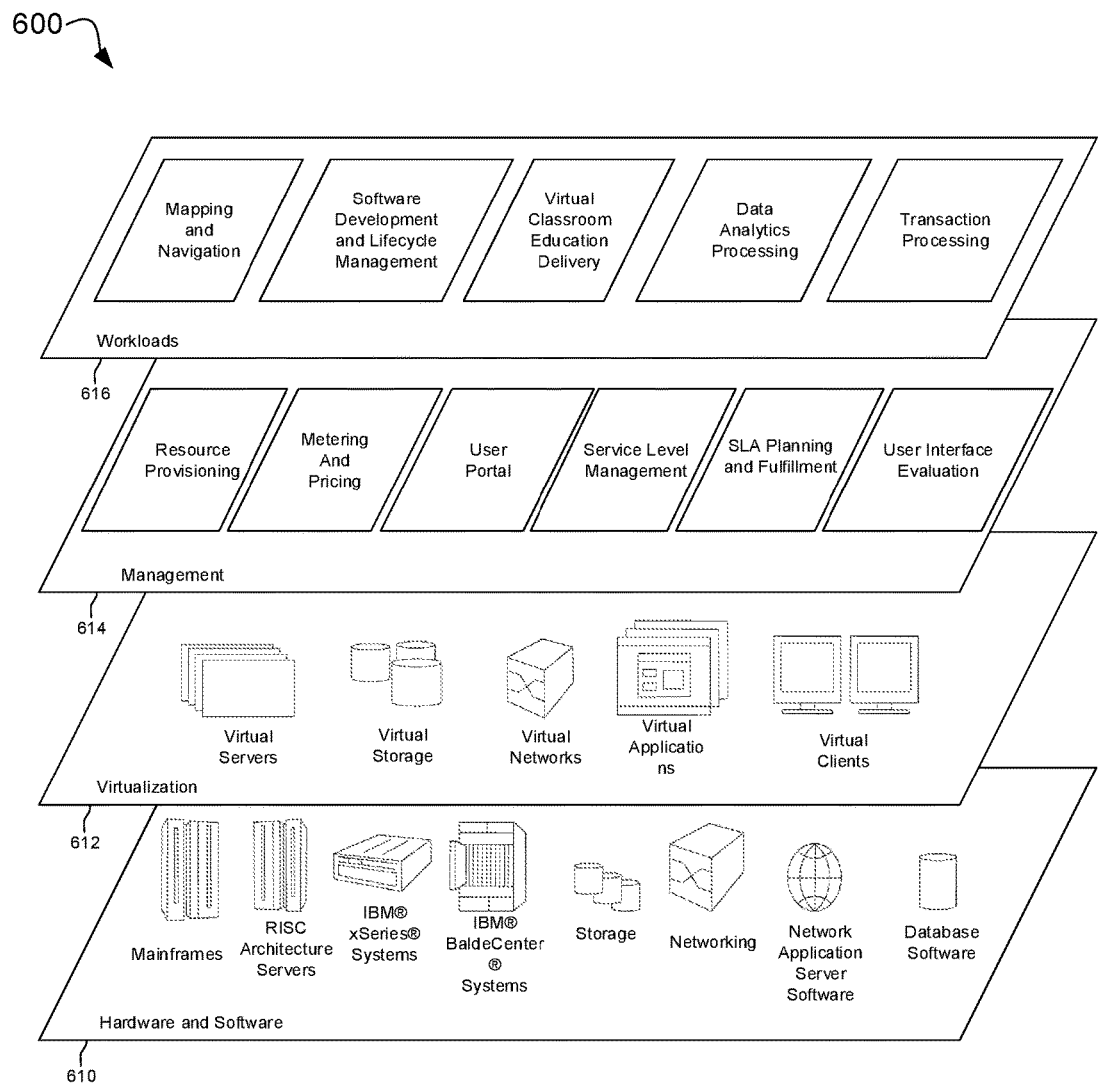
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes; RISC (Reduced Instruction Set Computer) architecture based servers; storage devices; networks and networking components. In some embodiments, software components include network application server software.

Virtualization layer 612 provides an abstraction layer from which the following examples of virtual entities may be provided: virtual servers; virtual storage; virtual networks, including virtual private networks; virtual applications and operating systems; and virtual clients.

In one example, management layer 614 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A User Interface Evaluation program may evaluate the usability of user interfaces.

Workloads layer 616 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for evaluating usability of at least one user interface, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

capturing a plurality of user interface data associated with the at least one user interface, wherein the plurality of user interface data comprises font data, screen data, and a plurality of ratios between the font data and the screen data;

determining whether the plurality of user interface data follows a plurality of user interface guidelines associated with the at least one user interface;

determining a plurality of scores for the at least one user interface, wherein determining the plurality of scores comprises detecting whether the at least one user interface includes user interface deviations from the plurality of user interface guidelines;

implementing the at least one user interface using the plurality of user interface data to log a plurality of usage data associated with the at least one user interface;

capturing a plurality of user interaction data associated with the at least one user interface based on the logging of the plurality of usage data associated with the at least one user interface;

detecting a plurality of correlations between the plurality of user interface data and the plurality of user interaction data based on the user interface deviations associated with the at least one user interface, wherein detecting the plurality of correlations comprises determining one or more effects the plurality of user interface data has on a user and the usability of the at least one user interface based on the plurality of user interface data and the plurality of user interaction data; and presenting the plurality of scores, the plurality of correlations, and a plurality of analysis based on the plurality of scores and the plurality of correlations by displaying the plurality of scores, the plurality of correlations, and the plurality of analysis in at least one report, wherein the at least one report comprises a plurality of correlation graphs plotting the plurality of correlations between the plurality of user interface data and the plurality of user interaction data.

2. The computer system of claim 1,
wherein the font data is selected from a group comprising at least one of a font size and a font color,
wherein the screen data is selected from a group comprising at least one of a background color, a screen size, and a screen resolution,
wherein the plurality of ratios between the font data and the screen data comprises at least one of a font size to screen size ratio, a font size to screen resolution ratio, and a font color to background color ratio, and
wherein the plurality of user interface data further comprises a plurality of placement of icons/links and a plurality of user interface controls.

3. The computer system of claim 1, wherein the plurality of user interface guidelines comprises at least one of a device guideline, a company guideline, and an industry guideline.

4. The computer system of claim 1, wherein the determining a plurality of scores for the at least one user interface further comprises:
determining a plurality of scores for at least one of a plurality of font size, a plurality of font color, a plurality of background color, a plurality of placement of icons and links, a plurality of screen size, a plurality of screen resolution, a plurality of font size to screen size ratio, a plurality of font size to screen resolution ratio, a plurality of font color to background color ratio, and a plurality of user interface controls; and
reducing the plurality of scores based on a plurality of deviations associated with the plurality of interface data and the plurality of user interface guidelines.

5. The computer system of claim 1, wherein the implementing the at least one user interface using the plurality of user interface data to log a plurality of usage data further comprises:
enabling a plurality of notifications based on the plurality of usage data.

6. The computer system of claim 5, wherein the plurality of user interaction data comprises at least one of a link click path associated with users, a distance covered by users to click on plurality of links, a time spent by users on a plurality of display screens, a plurality of actions performed on the plurality of display screens, and a think time for users to accomplish a plurality of tasks.

7. A computer program product for evaluating usability of at least one user interface, comprising:
one or more non-transitory computer-readable storage devices and program instructions stored on at least one of the one or more non-transitory computer-readable storage devices, the program instructions executable by a processor, the program instructions comprising:
program instructions to capture a plurality of user interface data associated with the at least one user interface, wherein the plurality of user interface data comprises font data, screen data, and a plurality of ratios between the font data and the screen data;
program instructions to determine whether the plurality of user interface data follows a plurality of user interface guidelines associated with the at least one user interface;
program instructions to determine a plurality of scores for the at least one user interface, wherein the program instructions to determine the plurality of scores comprises program instructions to detect whether the at least one user interface includes user interface deviations from the plurality of user interface guidelines;
program instructions to implement the at least one user interface using the plurality of user interface data to log a plurality of usage data associated with the at least one user interface;
program instructions to capture a plurality of user interaction data associated with the at least one user interface based on the logging of the plurality of usage data associated with the at least one user interface;
program instructions to detect a plurality of correlations between the plurality of user interface data and the plurality of user interaction data based on the user interface deviations associated with the at least one user interface, wherein the program instructions to detect the plurality of correlations comprises program instructions to determine one or more effects the plurality of user interface data has on a user and the usability of the at least one user interface based on the plurality of user interface data and the plurality of user interaction data; and
program instructions to present the plurality of scores, the plurality of correlations, and a plurality of analysis based on the plurality of scores and the plurality of correlations by displaying the plurality of scores, the plurality of correlations, and the plurality of analysis in at least one report, wherein the at least one report comprises a plurality of correlation graphs plotting the plurality of correlations between the plurality of user interface data and the plurality of user interaction data.

8. The computer program product of claim 7,
wherein the font data is selected from a group comprising at least one of a font size and a font color,
wherein the screen data is selected from a group comprising at least one of a background color, a screen size, and a screen resolution,
wherein the plurality of ratios between the font data and the screen data comprises at least one of a font size to screen size ratio, a font size to screen resolution ratio, and a font color to background color ratio, and
wherein the plurality of user interface data further comprises a plurality of placement of icons/links and a plurality of user interface controls.

9. The computer program product of claim 7, wherein the plurality of user interface guidelines comprises at least one of a device guideline, a company guideline, and an industry guideline.

10. The computer program product of claim 7, wherein the program instructions to determine a plurality of scores for the at least one user interface further comprises:
- program instructions to determine a plurality of scores for at least one of a plurality of font size, a plurality of font color, a plurality of background color, a plurality of placement of icons and links, a plurality of screen size, a plurality of screen resolution, a plurality of font size to screen size ratio, a plurality of font size to screen resolution ratio, a plurality of font color to background color ratio, and a plurality of user interface controls; and
- program instructions to reduce the plurality of scores based on a plurality of deviations associated with the plurality of user data and the plurality of user interface guidelines.

11. The computer program product of claim 10, wherein the plurality of user interaction data comprises at least one of a link click path associated with users, a distance covered by users to click on plurality of links, a time spent by users on a plurality of display screens, a plurality of actions performed on the plurality of display screens, and a think time for users to accomplish a plurality of tasks.

* * * * *